July 19, 1960

M. D. BURROWS ET AL 2,945,338

ROTARY CUTTER TYPE LAWN MOWER

Filed March 24, 1958

INVENTORS.
Milford D. Burrows
John W. Graham
William P. Barbour
BY D. Emmett Thompson
Attorney July 19, 1960 M. D. BURROWS ET AL 2,945,338
ROTARY CUTTER TYPE LAWN MOWER
Filed March 24, 1958 3 Sheets-Sheet 3

INVENTORS
Milford D. Burrows
John W. Graham
William P. Barbour
D. Emmett Thompson
Attorney

`2,945,338`

ROTARY CUTTER TYPE LAWN MOWER

Milford D. Burrows, Fayetteville, John W. Graham, Syracuse, and William P. Barbour, Pulaski, N.Y., assignors to The Porter-Cable Machine Company, Syracuse, N.Y., a corporation of New York Filed Mar. 24, 1958, Ser. No. 723,548

4 Claims. (Cl. 56—25.4)

This invention has to do with power-operated grass cutting machines, or lawn-mowers, of the type having a cutter journalled for rotation about a vertical axis.

More particularly, the invention has to do with power-operated riding type mowers having a frame supported on front and rear ground wheels with the cutter positioned between the front and rear wheels.

In mowers of this type, if the lawn is uneven because of mounds, ridges, bumps, etc., "scalping" usually occurs. That is, when the front and rear ground wheels are positioned on opposite sides of the bump or mound, the rotary cutter engages the ground with damage or dulling to the cutter, and the shaving off of the bump or the elevated portion of the ground, leaving a bare spot.

This invention has as an object a mower of the type referred to embodying a structural arangement by which the cutter is adjusted toward and from the ground to effect cutting of the grass in the proper length and, during such adjustment, the cutter is maintained substantially parallel to the ground and, during operation of the machine, the housing in which the cutter is journalled is permitted to follow the contour of the ground independently of the position of the machine proper at any time, whereby the selected height of the cutter is maintained regardless of unevenness of the lawn surface.

The invention consists in the novel features and in the combinations and constructions hereinafter set forth and claimed.

In describing this invention, reference is had to the accompanying drawings in which like characters designate corresponding parts in all the views.

In the drawings—

Figure 1:
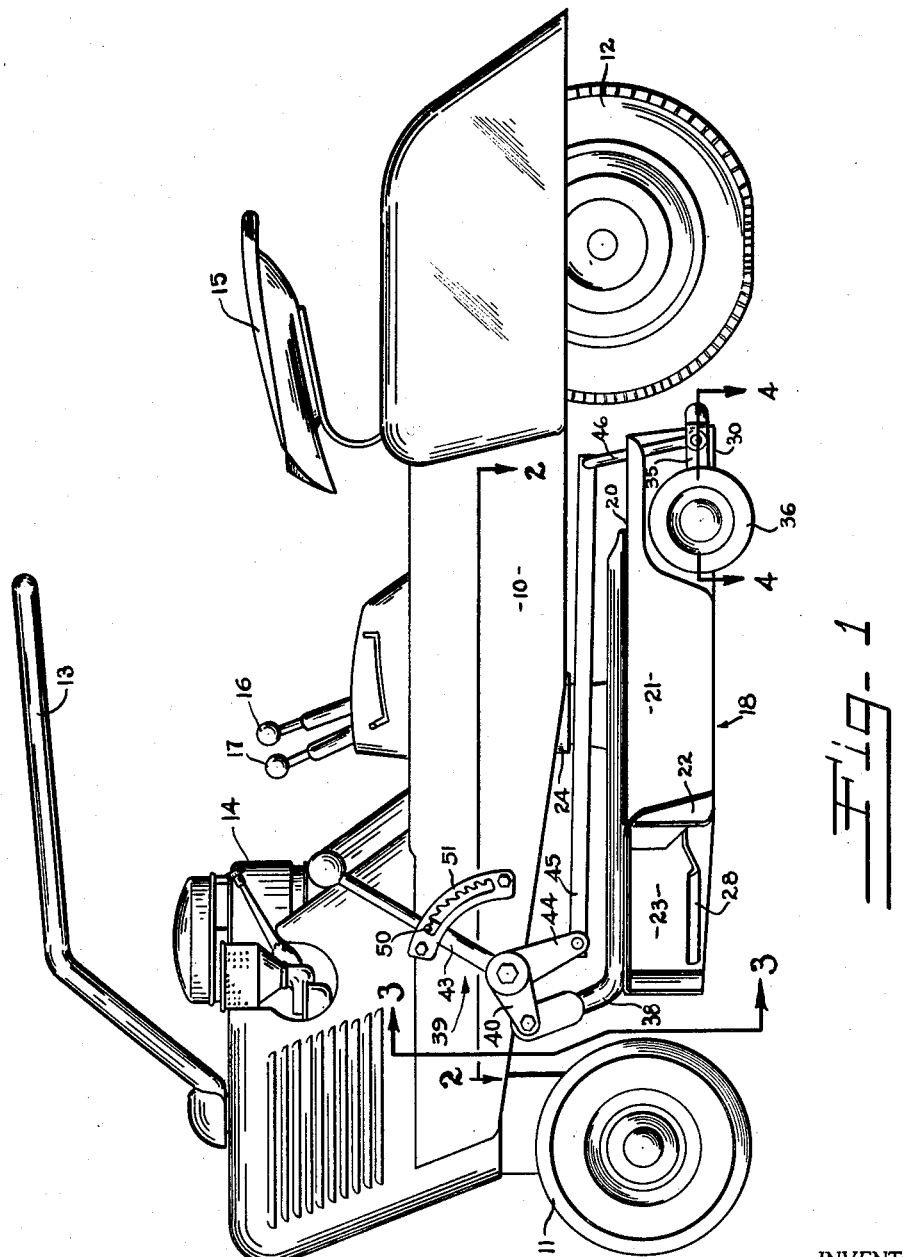
Figure 1 is a side elevational view of a grass cutting machine embodying our invention.

The machine proper here shown consists of a frame member 10 supported by front ground wheels 11 and rear ground wheels 12. The front wheels 11 are steerable by a tiller 13. An operating motor 14, usually of the internal combustion type, is mounted on the forward portion of the frame 10 and is operatively connected to the rear ground wheels 12 by suitable motion transmitting mechanism to effect forward and reverse motion of the machine. A suitable seat 15 is provided for the operator, and also controls 16, 17, for the operation of the motor and the forward and reverse movements of the machine.

This invention is directed particularly to the cutter assembly, including its suspension from the frame 10 and its adjustment toward and from the ground.

The cutter assembly consists of a housing generally indicated 18 which may be advantageously formed of sheet metal, the housing having a top wall 20 and a side wall in the nature of a substantially circular depending flange 21 having a portion 22 bent inwardly to form a discharge opening 23.

A hub member 24 is secured to the top wall 20 of the cutter housing, and a shaft 25 is journalled in the hub and has affixed to its upper end a pulley 26 engaged by a belt 27 extending from the motor 14 to effect rotation of the shaft. A cutter bar 28 is affixed to the lower end of the shaft 25.

One end of the cutter housing is supported by a ground contacting member, such as a wheel or roller, and the opposite end of the housing is suspended from the machine proper. The ground contacting member is attached to the cutter housing in such manner as to provide for relative vertical movement between the housing and the ground contacting member to vary the distance between the housing and the ground. The opposite end of the housing is suspended by linkage operable to vertically move that end of the housing. Means is provided for simultaneously operating the linkage and the ground contacting member in the same magnitude whereby, while one end of the housing is free to follow the contour of the ground, the housing is normally maintained in substantially parallel relation to the surface of the ground.

Figure 2:
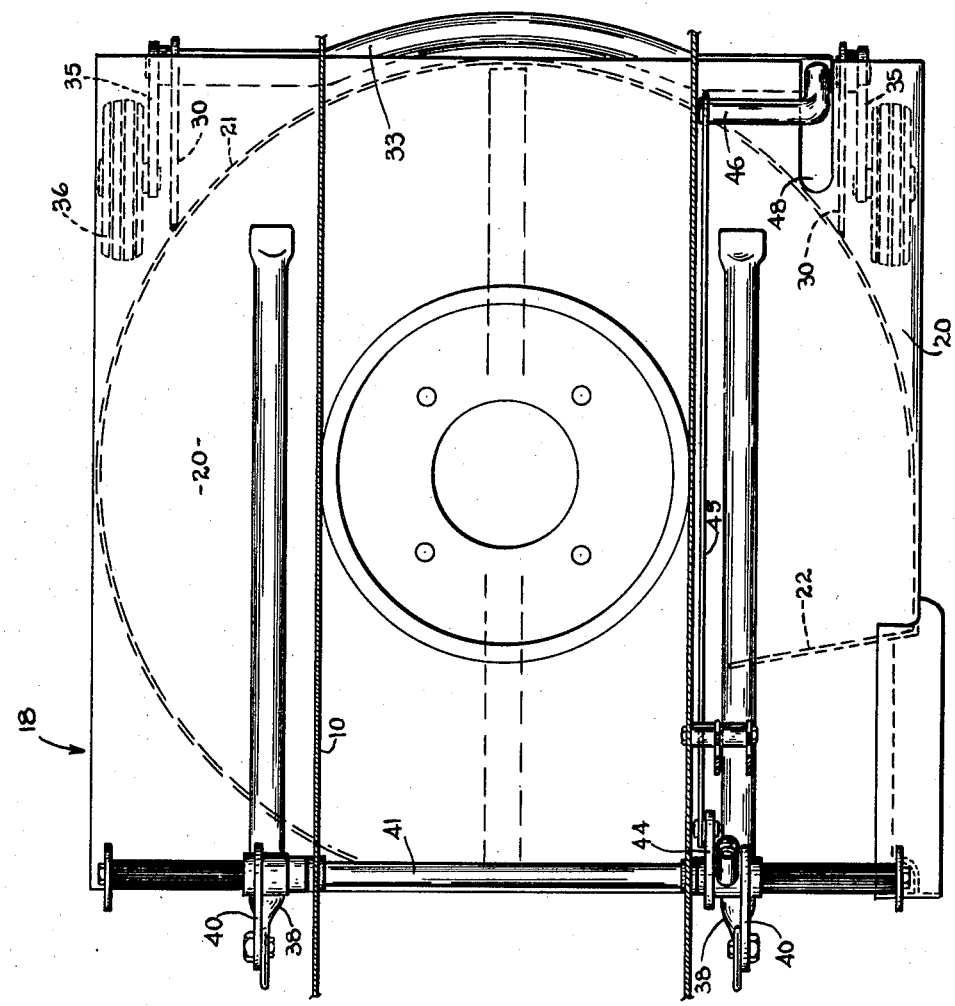
Figure 2 is a top plan view of the cutter assembly taken on a line corresponding to line 2—2, Figure 1.
Figure 4:
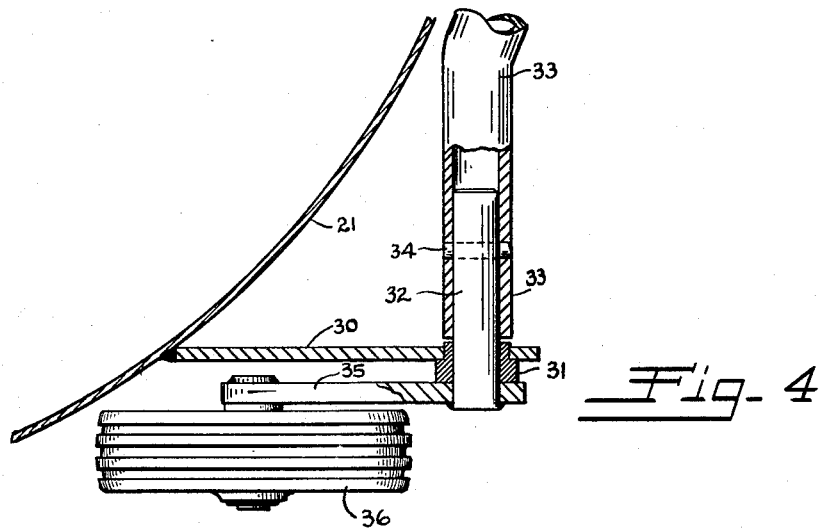
Figure 4 is a plan view with parts in section illustrating the mounting of one of the cutter assembly ground wheels, the view corresponding to line 4—4, Figure 1.
Figure 3:
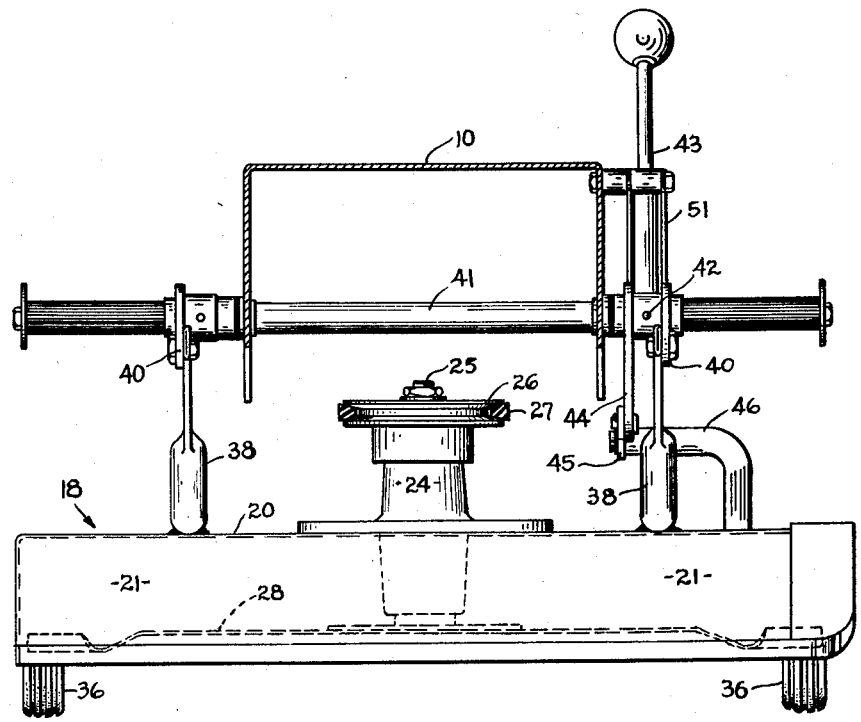
Figure 3 is a view taken on line 3—3, Figure 1.

In the arangement here shown, a pair of extensions 30 are affixed to the cutter housing, as by welding, and extend rearwardly therefrom, see Figures 2 and 4. The outer ends of the members 30 are apertured to receive bushings 31 in which stub shafts 32 are journalled. The inner ends of the stub shafts are connected to a tubular member 33, as by pins 34, see Figure 4. Affixed to the outer end of each stub shaft 32, as by welding, is a bracket 35 extending forwardly lengthwise of the frame member 10. A cutter housing ground wheel 36 is journalled on the forward free end of each bracket 35, these ground wheels serving to support the rear end portion of the cutter housing.

The cutter housing is provided with upwardly extending tubular members 38 pivotally connected at their upper ends to arms 40 fixedly secured to a shaft 41 journalled in the frame 10 and extending transversely thereof. The members 38 and arms 40 provide linkage for suspending the front end of the cutter housing from the machine.

There is an angle lever generally indicated at 39 fixedly secured to the shaft 41, as by a pin 42 exteriorly of one side of the frame member 10. One leg of this angle lever is in the form of a lever 43, and the other arm 44 of the angle lever is pivotally connected to a link 45 extending rearwardly and being pivotally connected at its rear end to an arm 46 fixedly secured to the member 33 and extending upwardly through a slot 48 formed in the top wall 20 of the cutter housing. The lever 43 is provided with a dogging pin 50 engageable with teeth formed in an arcuate member 51 secured to the frame member 10 for maintaining the lever in adjusted position.

With this arrangement, when the lever 43 is moved rearwardly, Figure 1, the arms 40 and links 38 effect upward movement of the front end of the cutter housing, and simultaneously effect forward movement of the link 45, creating counter-clockwise rotation of the stub shafts 32, effecting upward movement, in respect to the ground wheels 36, of the rear portion of the cutter housing. This linkage is laid out so that the movement of the forward end of the housing is of the same magnitude as the movement of the ground wheels 36 whereby, during the vertical adjustment of the cutter housing, it is maintained in substantially parallel relation to the ground.

It will be observed that the cutter housing, including the cutter 28, is pivotally suspended at its front end from the arms 40 and the rear end of the cutter housing is supported by the ground wheels 36, and is maintained at the selected distance above the ground by the position of the lever 43. The ground wheels 36 follow the contour of the ground, and thus automatically maintain the cutter housing in selected space arrangement from the ground, this spacing depending on the adjustment of the lever 43. With this arrangement, scalping of the lawn is eliminated, or reduced to a minimum.

What we claim is:

1. A grass cutting machine comprising a frame mounted upon ground wheels, a cutter assembly comprising a housing, a cutter journalled in the housing for rotation about a vertical axis, a ground contacting housing supporting member mounted on one end of said cutter housing for vertical movement relative thereto, an actuating member carried by said frame, linkage connecting said actuating member to said housing supporting member and to the opposite end of said housing and being operable upon actuation to move said supporting member and said opposite end of the housing vertically and in opposite directions of equal magnitude, whereby said housing is maintained in substantially parallel relation to the ground during such vertical movement, a motor mounted on the frame and being operatively connected to said cutter to effect rotation thereof.

2. A grass cutting machine, a frame mounted on ground wheels, a cutter assembly comprising a housing, a cutter journalled in the housing for rotation about a vertical axis, a bracket connected to one end of said housing for vertical movement relative thereto, a ground engaging housing supporting member journalled on said bracket for supporting said end of the housing, an actuating member carried by the frame, linkage connecting said actuating member to said bracket and to the opposite end of said housing and being operable upon actuation to move said bracket and said opposite end of the housing vertically and in opposite directions of equal magnitude, whereby said housing is maintained in substantially parallel relation to the ground during such vertical movement, a motor mounted on the frame and being operatively connected to said cutter to effect rotation thereof.

3. A grass cutting machine, a frame, front and rear ground wheels, a cutter housing positioned below the frame between said front and rear wheels, a pair of brackets pivoted at like ends to the housing at the rear portion thereof, a ground wheel journalled at the free end of each of said brackets, an actuator carried by said frame, linkage connecting said actuator to the forward end of the cutter housing, linkage connecting said actuator to said brackets, said linkage being operable upon movement of said actuator to effect movement of said cutter housing ground wheels toward and from said housing and simultaneously move the forward end of the housing in the opposite direction toward and from the ground.

4. A grass cutting machine of the riding type comprising an elongated frame supported by front and rear ground wheels, a cutter housing positioned between said front and rear ground wheels, a pair of brackets journalled at like ends to the housing and extending in a direction lengthwise of the frame, a ground wheel journalled at the free end of each of said brackets, said wheels being disposed at the rear end portion of the cutter housing for supporting the rear end thereof, a shaft journalled in said frame and extending transversely thereof, an angle lever fixedly mounted on said shaft, linkage pivotally connecting one arm of said angle lever to said brackets, linkage pivotally connecting the other arm of said angle lever to the forward end of said cutter housing, whereby said housing is supported by said shaft and said wheels in free floating fashion, an actuator connected to said angle lever for effecting rotation thereof, said linkage being operable upon rotation of said angle lever to effect movement of the cutter housing ground wheels in a vertical direction toward and from said housing and simultaneously move the forward end of said housing in the opposite direction toward and from the ground to provide for selective elevation of the cutter housing and to maintain said housing substantially parallel with the ground, and a power-operated cutter journalled in said housing for rotation about a vertical axis.

References Cited in the file of this patent
UNITED STATES PATENTS

| | | |
|---|---|---|
| 2,568,822 | Pervis | Sept. 25, 1951 |
| 2,595,289 | Peterson | May 6, 1952 |
| 2,763,977 | Spencer et al. | Sept. 25, 1956 |
| 2,780,475 | Koerner | Feb. 5, 1957 |
| 2,801,510 | Colburn | Aug. 6, 1957 |
| 2,818,269 | Northcote et al. | Dec. 31, 1957 |